July 10, 1951 V. D. LANDON 2,559,644
PULSE MULTIPLEX SYSTEM
Filed Sept. 18, 1948
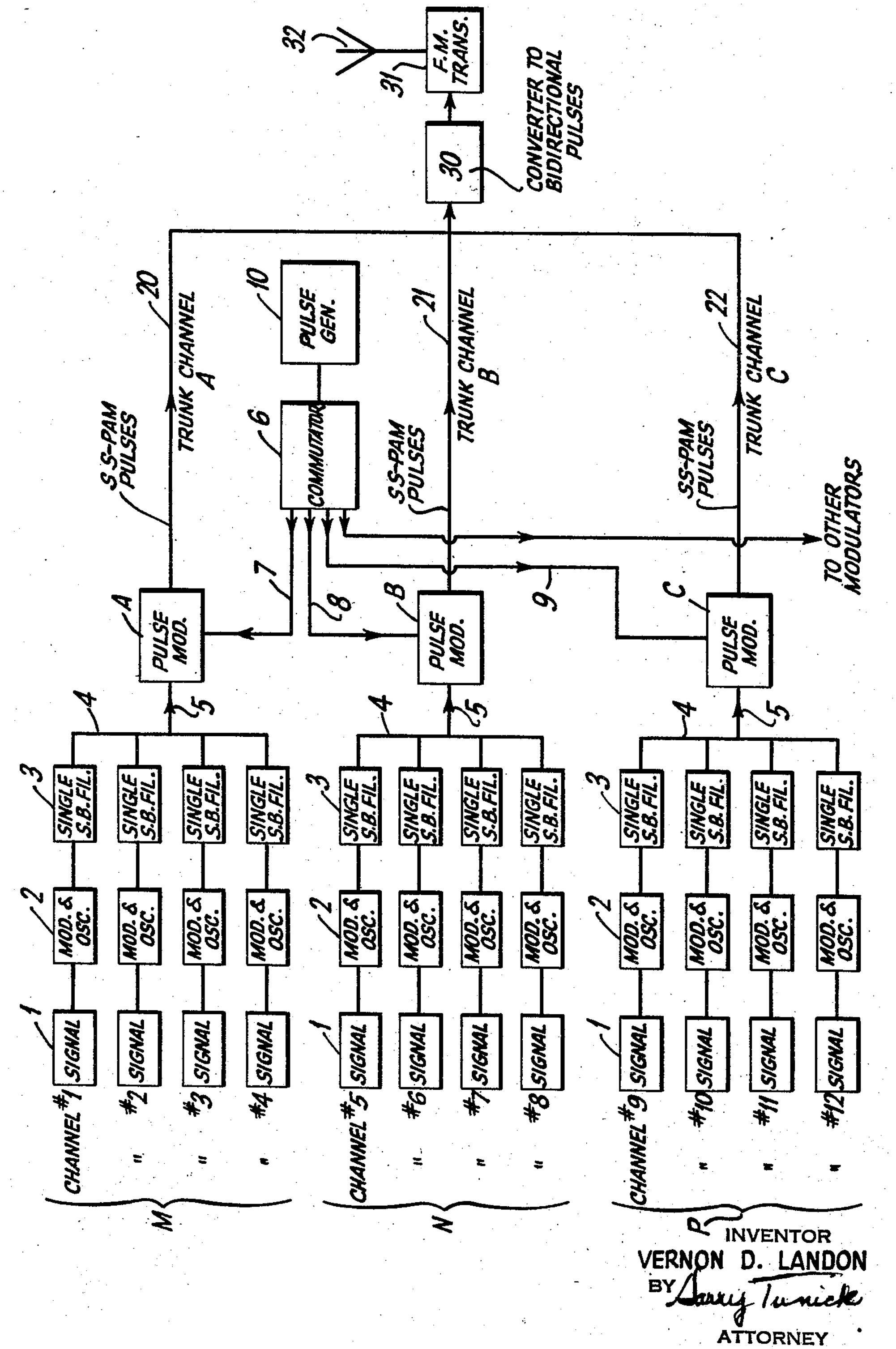
INVENTOR
VERNON D. LANDON
BY Harry Tunick
ATTORNEY Patented July 10, 1951

2,559,644

UNITED STATES PATENT OFFICE 2,559,644

PULSE MULTIPLEX SYSTEM

Vernon D. Landon, Princeton, N. J., assignor to Radio Corporation of America, a corporation of Delaware Application September 18, 1948, Serial No. 49,885

9 Claims. (Cl. 179—15)

The present invention relates to a pulse multiplex system, and particularly to the transmitting end of a time division pulse multiplex system.

The system of the present invention herein identified as by the symbols $SS_{n1}$, $PAM_{n2}\pm FM$, enables the transmission of intelligence over a relatively large number of channels in a multiplex system by means of pulses with high signal-to-noise ratio. Many of these symbols are incorporated in Standards on Antennas, Modulation Systems, and Transmitters, Definitions of Terms, issued in July 1948 by the Institute of Radio Engineers. The symbol SS designates a single side band containing the intelligence. The symbol PAM refers to pulse amplitude modulation, while the symbol FM refers to frequency modulation. The $\pm$ designation is used to indicate the bidirectional nature of the pulses employed to frequency modulate the carrier. The $n1$ symbol designates the number of single side band frequency displaced channels in a group while the $n2$ symbol designates the number of trunk time division channels. The total number of channels in the system is represented by $n=n1\ n2$. Thus the $SS_{n1}$,$PAM_{n2}\pm FM$ system of the invention is a system wherein a plurality of single side bands with spaced carriers (containing different intelligence signals) modulate the amplitude of a series of D. C. pulses, and the resultant amplitude modulated pulses of double polarity are used to frequency modulate a carrier.

A more detailed description of the invention follows in conjunction with a drawing whose single figure illustrates the transmitting end of a pulse multiplex system in accordance with the invention.

Referring to the drawing, there are shown a plurality of groups of single side band channels. Only several of these groups are shown and identified as M, N and P, although in practice, many more such groups will be used. Group M is shown as having four channels 1 to 4, while group N has four channels 5 to 8, and group P has four channels 9 to 12. Additional similar groups each having four channels may be provided to make up a system having a total of 28 to 48 or more individual single side band channels.

The single side band channels in each group are displaced from one another in frequency; or stated otherwise, they have spaced sub-carrier frequencies. Each channel has a message or intelligence signal source 1 which feeds into or acts upon a modulator and oscillator 2, the latter in turn being coupled to a single side band filter 3 whose output is a band of frequencies containing the modulation. The carrier displaced single side bands of each group M, N and P are combined in connection 4 and fed into a lead 5 for modulating the amplitude of a series of D. C. pulses produced in pulse modulators A, B, and C, respectively.

The sub-carrier frequency of a particular channel in any one group may be the same as that of a corresponding channel in any other group. In general, the same four bands of frequencies in any one group of channels (for example, channels 1 to 4 in group M) may be repeated in any other group or groups of channels.

Although only four channels have been shown in each of the groups, it is to be understood that a lesser or greater number of channels may be used in the groups.

Pulse modulators A, B, C etc. are similar in construction and each produces a series of D. C. pulses whose pulse rate is several times higher, preferably at least 2½ times higher, than the highest side band frequency fed thereto by its associated channels. Hence, the output from each pulse modulator contains a whole series of D. C. pulses whose envelope will trace out the modulation of all side band channels connected thereto.

The different pulse modulators A, B, C, etc. are sequentially controlled by a commutator 6 which supplies the pulse modulators with pulses which occur sequentially in leads 7, 8, 9 etc. Thus, pulse modulator A is first fed with a pulse from commutator 6 over lead 7, after which pulse modulator *b* is fed with the next pulse from commutator 6 over lead 8, after which pulse modulator C is fed with the third or next occurring pulse from commutator 6 over lead 9, etc. This sequential control is repeated for each cycle of operations of the commutator 6. The result is a series of pulses supplied by the commutator to each of the different pulse modulators, and these pulses are interlaced or time displaced relative to each other. Put in other words, during the interval between two successive pulses fed by the commutator 6 to a given pulse modulator, there are other pulses fed by the commutator to all of the other pulse modulators.

Commutator 6 is preferably electronic and may be of any suitable type; for example, the kind shown in copending application Serial No. 608,957, filed August 4, 1945 by W. D. Houghton, now U. S. Patent 2,531,817, November 28, 1950, assigned to the common assignee, or in Farrington Patent 2,413,440, granted December 31, 1946, wherein a step voltage wave generator is employed to cause differently biased channel selectors to respond successively on different risers or stairs of the step voltage wave. The step wave generator is fed by a pulse generator 10. Applicant's pulse generator 10 corresponds to the pulse generator 12 of the Farrington patent, while applicant's commutator 6 and pulse modulators A, B and C correspond respectively to the step wave generator 11 and switching stages 13, 14, 15 of the Farrington patent, supra.

The output from pulse modulator A is a series of uniformly spaced unidirectional pulses which are amplitude modulated by the four side band signals in channels 1 to 4. Similarly, the outputs from each pulse modulator B, C, etc. is also a series of uniformly spaced unidirectional pulses which are amplitude modulated by the different side band signals respectively associated with each given pulse modulator. The amplitude modulated pulse outputs from the different pulse modulators, A, B, C, etc. are interlaced and fed over trunk channels (time division channels) 20, 21, 22 etc. to a common converter circuit 30 which converts the unidirectional (single polarity) modulated pulses in leads 20, 21, 22 to bidirectional (double polarity) pulses whose direction or polarity depends upon the amplitude value of the amplitude modulated unidirectional pulse fed to the converter relative to a predetermined value. Thus, if the unidirectional pulse supplied to said converter has an amplitude greater than said predetermined value, the output from said converter will be a pulse in one direction, whereas if the amplitude of said unidirectional pulse is less than said predetermined value, the output from said converter will be a pulse in the opposite direction. The amplitude of the bidirectional pulses will depend upon the degree of modulation of the unidirectional pulses. Such converter apparatus is known and is described in copending application Serial No. 751,698, filed June 2, 1947, now U. S. Patent No. 2,548,796, granted April 10, 1951 by W. D. Houghton, assigned to the common assignee. Similar converter apparatus is described in Houghton U. S. Patent 2,480,137 granted August 30, 1949.

The interlaced bidirectional pulses in the output of converter 30 are used to frequency modulate the carrier of a frequency modulation transmitter 31 from which there is obtained a continuous frequency modulated wave, in turn, fed to an antenna 32.

Referring to the symbols hereinbefore employed as generally designating the system of the invention, the signals appearing in leads 5 are represented by SS, while the unidirectional D. C. pulses which are amplitude modulated by the single side band carriers and appear in leads 20, 21 and 22 are represented by SS—PAM. The signals appearing in the output of the frequency modulation transmitter 31, however, are $$SS_{n1},PAM_{n2}\pm FM$$

The symbol $n1$ in the description of the system given above is 4 and refers to the number of channels in each group M, N, P, etc. The symbol $n2$ refers to the number of trunk channels 20, 21, 22, etc. and in the case of a system employing twelve groups of four single side band channels, would be 12. In such a system, the total number of 48 channels is given by $n=n1n2$ or $4\times12=48$.

It should be noted that with a commutator of the step voltage wave type, each riser or stair in the step controls a particular trunk channel which, in turn, handles a plurality of intelligence channels. Such an arrangement enables a single generator of step voltage waves to be used in a novel manner in a multiplex system for handling a relatively large number of channels. The use of $SS_{n1},PAM_{n2}\pm FM$ system of the invention has been found to be superior to other systems and to give a high signal-to-noise ratio.

The remotely located receiving equipment, not shown, will include a frequency modulation detector for reproducing the series of D. C. pulses modulated in amplitude. These last pulses will, in turn, be passed on to a commutator preferably similar to and operating in synchronism with the commutator at the transmitter. This commutator at the receiver will separate the pulses into trunk channels corresponding in number and position to the trunk channels at the transmitter end of the system. The output of the modulator into a given trunk channel will consist of a series of D. C. pulses modulated with its several single side band signals. The original single side band signals used as modulation on the pulses may be re-obtained by passing the modulated pulses through a low pass filter with cut-off at the highest single side band frequency. The signals of the individual channels may then be filtered out by the use of band pass filters.

The above mentioned low pass filter is for explanatory purposes only and is not needed in the actual equipment. The modulated pulses are fed directly into the input circuits of the band pass filters and the single-channel single side band signals make their appearance in the output circuits. The sub-carrier is then re-inserted and the signal is demodulated or detected.

What is claimed is:

1. In a pulse communication system the method which includes impressing the intelligence to be transmitted upon a carrier, deriving therefrom a single side band of frequencies containing the modulation, producing a series of spaced direct current pulses, modulating the amplitude of said series of direct current pulses by said single side band, thereby producing a series of amplitude modulated unidirectional pulses, converting said unidirectional pulses to bidirectional pulses whose direction or polarity depends upon whether the amplitude of said unidirectional pulses is above or below a predetermined value, and modulating the frequency of a carrier by said bidirectional pulses.

2. In a pulse communication system the method which includes impressing the intelligence to be transmitted upon a carrier, deriving therefrom a single side band of frequencies containing the modulation, producing a series of spaced direct current pulses, modulating the amplitude of said series of direct current pulses by said single side band, thereby producing a series of amplitude modulated unidirectional pulses, converting said unidirectional pulses to bidirectional pulses whose amplitude and direction depends upon the degree of modulation on said unidirectional pulses, and modulating the frequency of a carrier by said bidirectional pulses.

3. In a pulse communication system, the method which includes modulating the amplitude of a series of recurring uniformly spaced single polarity pulses by a single side band containing the intelligence to be transmitted, converting said single polarity pulses to double polarity pulses whose amplitude and polarity depends upon the degree of modulation of said single polarity pulses, and modulating the frequency of a radio frequency carrier by said double polarity pulses.

4. A pulse multiplex system comprising a plurality of single side band channels having spaced sub-carrier frequencies, a source of uniformly spaced direct current pulses, means for combining said single side band channels and modulating the amplitude of said pulses therewith, to thereby produce a series of unidirectional direct current amplitude modulated pulses, means for converting said unidirectional pulses to bidirectional pulses whose direction or polarity depends upon the magnitude of the unidirectional pulse relative to a predetermined value, a radio transmitter, and means for modulating the frequency of said radio transmitter by said bidirectional pulses.

5. A pulse multiplex transmitting system comprising a plurality of channels each including a source of signals, a modulator and oscillator, and a single side band filter coupled to the output of said modulator and oscillator, the output frequencies from the different single side band frequencies being displaced from one another, a pulse modulator for producing a series of direct current single polarity pulses, means combining the outputs from said single side band filters and supplying said outputs to said pulse modulator for modulating the amplitude of the direct current single polarity pulses produced by said pulse modulator, a converter of single polarity pulses to double polarity direct current pulses coupled to the output of said pulse modulator, and a frequency modulation transmitter coupled and responsive to the output of said converter.

6. A pulse multiplex transmitting system comprising a plurality of groups of channels, each channel producing single side band signals, the carrier frequencies in the different channels of each group being spaced from one another, a source of recurring uniformly spaced unidirectional pulses for each group of channels, the pulses from each source being time displaced with respect to the pulses from any other source associated with another group, means combining the single side band signals from all of the channels in each group and modulating the amplitude of the unidirectional pulses produced by the source associated therewith, means combining the resulting amplitude modulated pulses from the different sources, a converter coupled to said last means and changing said unidirectional pulses to bidirectional direct current pulses whose direction depends upon the degree of amplitude modulation of said unidirectional pulses, and a frequency modulation transmitter, coupled to the output of said converter and responsive to the bidirectional pulses.

7. A pulse system in accordance with claim 6, characterized in this that each group has the same number of single side band channels, and the same bands of frequencies occur in each group.

8. A pulse multiplex transmitting system comprising a plurality of groups of single side band channels, the single side band channels in each group having spaced carrier frequencies, a pulse modulator for each group for producing a series of recurring spaced direct current pulses, means combining the outputs of each group and coupled to the associated pulse modulator for causing amplitude modulation of the direct current pulses produced by said associated pulse modulator, a commutator coupled to and sequentially controlling said pulse modulators for interlacing the direct current pulses from the different pulse modulators, means combining the outputs from said pulse modulators, a converter coupled to said last means and changing said unidirectional pulses to bidirectional direct current pulses whose direction depends upon the degree of amplitude modulation of said unidirectional pulses, and a frequency modulation transmitter coupled to the output of said converter and responsive to the bidirectional pulses.

9. In a pulse communication system the method which includes impressing different signals to be transmitted upon different spaced carriers, deriving from each carrier a single side band of frequencies containing the modulation, producing a series of spaced direct current pulses, sequentially modulating the amplitudes of said series of direct current pulses by said single side bands, thereby producing a series of time spaced amplitude modulated unidirectional pulses, converting said unidirectional pulses to bidirectional pulses whose direction or polarity depends upon whether the amplitude of said unidirectional pulses is above or below a predetermined value, and modulating the frequency of a continuous frequency main carrier by said bidirectional pulses.

VERNON D. LANDON.

REFERENCES CITED

The following references are of record in the file of this patent:

UNITED STATES PATENTS

| Number | Name | Date |
|---|---|---|
| 2,298,409 | Peterson | Oct. 13, 1942 |
| 2,326,515 | Bartelink | Aug. 10, 1943 |
| 2,380,982 | Mitchell | Aug. 7, 1945 |
| 2,468,038 | Clavier | Apr. 26, 1949 |

FOREIGN PATENTS

| Number | Country | Date |
|---|---|---|
| 289,102 | Great Britain | 1929 |

OTHER REFERENCES

"Microwave Radio Relay Systems," Electrical Communications pp. 131–150, June 1947.

"Multiplex Broadcasting," Electrical Communications pp. 19–26, vol. 23, 1946.